United States Patent [19]

Hodge

[11] Patent Number: 4,797,216

[45] Date of Patent: Jan. 10, 1989

[54] DELAYED CROSSLINKER COMPOSITION

[75] Inventor: Richard M. Hodge, Sand Springs, Okla.

[73] Assignee: Dowell Schlumberger Incorporated, Tulsa, Okla.

[21] Appl. No.: 931,772

[22] Filed: Nov. 17, 1986

Related U.S. Application Data

[62] Division of Ser. No. 831,229, Feb. 19, 1986, Pat. No. 4,657,081.

[51] Int. Cl.[4] .............................................. E21B 43/26
[52] U.S. Cl. ................................. 252/8.551; 166/308; 252/315.3
[58] Field of Search ....................... 166/271, 307, 308; 252/8.551, 8.553, 315.3; 556/5, 6, 55

[56] References Cited

U.S. PATENT DOCUMENTS

| | | | |
|---|---|---|---|
| 4,018,286 | 4/1977 | Gall et al. | 166/295 |
| 4,460,751 | 7/1984 | Hanlon et al. | 166/274 X |
| 4,470,915 | 9/1984 | Conway | 252/8.551 |
| 4,477,360 | 10/1984 | Almond | 252/8.551 |
| 4,488,975 | 12/1984 | Almond | 252/8.551 |
| 4,553,601 | 11/1985 | Almond et al. | 166/308 |
| 4,609,479 | 9/1986 | Smeltz | 252/8.551 |

*Primary Examiner*—Herbert B. Guynn
*Attorney, Agent, or Firm*—Stephen A. Littlefield

[57] ABSTRACT

A crosslinker composition that can produce delayed crosslinking of an aqueous solution of a crosslinkable organic polymer. The composition comprises a metal compound, preferably an organic metal complex, and most preferably an organic zirconium complex. The composition further contains an organic hydroxycarboxylic acid, preferably hydroxyacetic acid. The pH of the composition is preferably no more than 4.8. The pH of the composition is further preferably such that when sufficient amount of composition is added to an aqueous polymer solution to result in delayed crosslinking of the polymer, the composition produces a pH in the resulting gel solution, preferably of between about 3 and about 4.5. Gel solutions produced using the composition are particularly useful in fracturing subterranean formations, and in particular in fracturing subterranean formations penetrated by an oil well in which fracturing process carbon dioxide and a proppant are added to the fracturing fluid. Aqueous organic polymer solutions which can be crosslinked by the composition, include guar, hydroxypropyl guar, carboxymethylhydroxypropyl guar, and carboxymethylhydroxyethyl cellulose.

13 Claims, No Drawings

DELAYED CROSSLINKER COMPOSITION

This is a divisional of application Ser. No. 831,229, filed Feb. 19, 1986, now U.S. Pat. No. 4,657,081.

FIELD OF THE INVENTION

This invention relates to a composition useful for providing delayed crosslinking of an aqueous solution of an organic polymer to produce a gel, the amount of delay being adjustable by adjusting the concentration of components present in the composition.

DESCRIPTION OF RELATED ART

A known technique in fracturing a subterranean formation, particularly an oil-bearing formation, involves pumping a fluid down the well at a sufficient flow rate pressure to fracture the subterranean formation. In order to prevent the resulting fracture from closing upon release of fluid pressure, typically a hard particulate material known as a proppant, is dispersed in the fracturing fluid to be carried into the resulting fracture and deposited there. It is desirable that the fracturing fluid have a fairly high viscosity, and preferably a gel-like consistency, at least when it is within the fracture so that the proppant can be carried as far as possible into the resulting fracture. Previously, a relatively high viscosity fracturing fluid, or gel, would be prepared on the surface and the proppant dispersed therein, such gelled fluid then being pumped down the well. Such a procedure requires high pumping pressures due to the high viscosity of the gelled fluid as it is pumped down the wellbore, and results in high friction losses within the bore and pipes. In fact, the viscosity of the gel prepared on the surface might often be lower than the viscosity desired within the fracture due to viscosity limitations imposed upon the gel by the pumping abilities of typical pumps used in such an operation. Further, fully crosslinked fluids may suffer irreparable viscosity degradation from the high shear environment experienced in the wellbore. Thus, it would be desirable that the fracturing fluid exhibit a relatively low viscosity as it is being pumped down the wellbore, and in addition exhibit a relatively high viscosity when it is within the fracture itself.

In a particular fracturing method known as "foam fracturing", carbon dioxide is pumped along with the fracturing fluid into the wellbore. Foam fracturing was pioneered by Blauer et al. in U.S. Pat. No. 3,937,283, and others have followed. See for example, U.S. Pat. No. 4,480,696 and the patents cited therein. U.S. Pat. No. 4,488,975 further discloses in such a fracturing method, the use of aqueous organic polymer solutions (such as carboxyalkylhydroxyalkyl guar solutions) and organic metal complexes (such as Zr and Al complexes) to crosslink such polymers to produce a gel. In the method of the preceding patent, crosslinking occurs only at a low pH, and the proper addition rate of carbon dioxide is relied upon to produce an appropriate pH range for such crosslinking. In the practice of the foregoing method though, carbon dioxide equipment failure could result, with consequent drastic changes in the pH of the polymer solution and therefore drastic changes in the ultimate rheology of the fracturing fluid. One method of overcoming this problem, which has been used in the past, was to add a buffer to the fracturing fluid (which would typically be close to pH 7) before addition of the crosslinker composition. Such an approach though, in addition to being time consuming, may cause corrosion of the tanks commonly used to store fluid on location. Corrosion of the tanks can cause iron contamination of the fracturing fluid, which results in premature viscosity reduction of it. It would also be desirable then, to have a crosslinker composition which is itself acidic (with a pH of less than about 5, and typically less than about 4) and is stable under such acidic conditions, such that when a sufficient quantity of it is added to the polymer solution to crosslink the polymer, the pH of the polymer solution can be simultaneously reduced from about 7 (the typical pH before $CO_2$ is added, or when there is $CO_2$ equipment failure) to less than about 5, and preferably less than 4.

Fracturing fluids which have been used in the past include aqueous solutions of polymers such as guar, hydroxypropyl guar (HPG), carboxymethyl hydroxyethyl cellulose (CMHEC), and carboxymethylhydroxypropyl guar (CMHPG), and the like, or a combination of such polymers. Use of one or more of the foregoing aqueous polymer solutions or other similar aqueous polymer solutions is disclosed in U.S. Pat. Nos. 4,470,915, 4,460,751, 4,369,124, 4,462,917 and 4,018,286. The foregoing patents also disclose methods whereby various organic metal complexes are used to crosslink the polymers. For example, U.S. Pat. No. 4,369,124 discloses crosslinking many of the foregoing aqueous polymer solutions by utilizing certain specified organic titanium monomers or polymers. Such titanium complexes are provided in solid form and the rate of reaction or crosslinking rate is controlled by the rate of dissolution of the titanium complex. U.S. Pat. No. 4,470,915 on the other hand, attempts to delay crosslinking of polymers by organotitanate chelates such as titanium ammonium lactate or titanium triethanolamine, by using various polyhydroxy alcohols as a crosslinking delaying agent. The patent states that the pH of the aqueous gelling agent is adjusted to between about 5 and about 10.5 to ensure that the crosslinking reaction can take place within the desired period of time.

U.S. Pat. No. 4,018,286 crosslinks various polymers, including polysaccharides and substituted celluloses, by using various metal ions including $Ti^{+4}$, $Zn^{+2}$, complexed with a "retarding ion". The "retarding ion" can be acetate, nitrilotriacetate, tartrate, citrate, tripolyphosphate, metaphosphate, gluconatgels, or phosphate anion. The resulting gels are indicated as useful for plugging underground formations, and must have a pH range of about 3 to about 7, and in fact are broken by changing the pH below or above the foregoing limits. U.S. Pat. No. 4,470,915 on the other hand, discloses forming gels from aqueous polymer solutions maintained at a pH of about 5 to 10.5, wherein the polymer is selected from solvatable polysaccharides such as guar, HPG, and the sodium salt of CMHPG. Organotitanate chelates such as titanium triethanolamine and titanium acetylacetonate, are used in combination with various "polyhydroxycarboxylic acids" (i.e., acids having a plurality of carboxyl functions and at least one hydroxy function), as an agent to retard crosslinking of the polymer. U.S. Pat. No. 4,460,751 utilizes a crosslinker composition to crosslink polymers including cellulose ethers such as carboxymethyl cellulose (CMC) and CMHEC, which composition includes water, $Zr^{+4}$, an alpha-hydroxycarboxylic acid, and an amine such as triethanolamine. The patent indicates that the amine and hydroxy acid delay the crosslinking action. The patent also indicates that although the crosslinker composition can be used over a wide pH range, the composition itself should have a pH of between about 5 to about 8.

Thus, it would appear that only those crosslinker compositions disclosed in U.S. Pat. No. 4,018,286 and U.S. Pat. No. 4,369,124 could possibly provide delayed crosslinking and be potentially useful in a low pH fracturing fluid (for example, around pH 4 for fluids containing $CO_2$). However there are problems associated with such compositions which limit their use in commercial practice. U.S. Pat. No. 4,369,124 relies upon "controlled dissolution" of a solid organic titanium complex. The gels from U.S. Pat. No. 4,018,286 break at a pH of below 3. In any event, none of the crosslinker compositions disclosed in any of the foregoing patents can be maintained at a low pH so as to avoid the problems associated with carbon dioxide loss discussed above and use hydroxyacetic acid to provide a selected delay in the crosslinking of aqueous solutions of the organic polymers discussed, by organic titanium complexes.

SUMMARY OF THE INVENTION

The present invention provides a novel composition that can produce delayed crosslinking of an aqueous solution of a crosslinkable organic polymer, which solution comprises an organic metal complex and an organic hydroxymonocarboxylic acid. The composition has a pH of preferably no more than 4.8. Preferably an organic zirconium complex is used for the organic metallic complex. Preferably the hydroxycarboxylic acid is hydroxyacetic acid, and the metal complex is zirconium triethanolamine. The polymers which may be utilized with the composition as described, include guar, HPG, CMHPG, and CMHEC. The composition preferably has present the following weight precentages: about 1% to about 10% metal from the metal complex; about 2% to about 37% hydroxyacetic acid; about 0% to about 64% acetic acid; and an amount of solvent (typically isopropanol and water) in a weight percentage of about 7% to about 54%. All of the foregoing weight percentages are based on the total weight of the composition (throughout this application where a weight percentage of a substance in any composition is given, such is based on the total weight of the composition unless otherwise stated). A sufficient amount of the composition is preferably combined with a polymer solution having sufficient polymer present, such that the resulting mixture of the polymer solution and the composition (often referred to herein as the "gel solution") has by weight percentage (based upon the total weight of the mixture), between 0.24% to 0.96% polymer, 0.0017 % to 0.023% metal from the organic metal complex, and 0.008% to 0.4% hydroxycarboxylic acid (preferably hydroxyacetic acid), and 0 to 4% acetic acid.

The composition has particular application in a method of fracturing subterranean formations penetrated by a well, particularly wherein carbon dioxide is added to the fracturing fluid. In such case, the composition contains sufficient acid to produce a pH in the mixture of fracturing fluid and composition, preferably between about 3 and about 5 when the pH of the polymer solution is substantially 7 (which implies that the composition have a pH no greater than about 4.5). That is, even if the pH of the polymer solution prior to addition of the composition, was less than 7 due to prior addition of carbon dioxide, if the pH of the polymer solution should suddenly increase to about 7 due to carbon dioxide failure, the composition is sufficiently acidic such that the pH would still be still maintained low, preferably about 3 to about 5, and more preferably about 3 to 4. Other conventional fracturing fluid additives can, of course, be added to compositions of the present invention, provided they are not incompatible in the formulated fluid.

DETAILED DESCRIPTION OF EMBODIMENTS OF THE INVENTION

In order to illustrate crosslinking of various aqueous organic polymer solutions and the variation in delay of crosslinking which may be obtained by varying concentrations of constituents in crosslinker compositions of the present invention, a number of vortex closure tests were performed as illustrated in Example 1 below. Such vortex closure tests provide a means for obtaining a reasonably good estimate of the time required to complete crosslinking of the polymer by an organic metal complex. Complete closure of the vortex indicates a substantial degree of crosslinking.

Example 1

The organic polymer solution used (often referred to as the "fracturing fluid") contained 0.48 percent by weight (hereinafter often referred to as "wt. %") HPG in water. Triethanolomine titanate in a propanol solution was mixed with acetic acid in a mole ratio of acetic acid to organic titanium complex, of 19/2. A sufficient amount of hydroxyacetic acid was then added to this latter solution to produce crosslinker compositions of the present invention. The amount of hydroxyacetic acid present in the crosslinker compositions used in the four trials reproduced in Table I below varied, but was sufficient to produce the desired hydroxyacetic acid concentration specified in each trial in Table I upon addition of sufficient crosslinker composition to the fluid to obtain a titanium concentration of 0.0024M (0.012 wt. %) in the resulting mixture (often referred to as the "gel solution"). In each of the trials also, this procedure produced a concentration of acetic acid of .14 weight %, and a pH of approximately 4. The crosslinker compositions were then combined with the aqueous polymer solutions as follows:

(1) 250 mL of the polymer solution was placed in a 500 mL WARING blender jar. The solution was mixed at low speed to form the maximum vortex with a minimum of air entrainment.

(2) Sufficient crosslinker composition (again including sufficient hydroxyacetic acid in each case to produce the required concentration in the gel solutions) was then added to the polymer solution to obtain a titanium concentration of 0.012 wt. % of the solution. The time required for the vortex to completely close at room temperature was then recorded. In trials 5 to 17 of Table I below, the amount of crosslinker composition added to the polymer solution was reduced such that the titanium concentration in the final mixture was 0.0012M (0.006 wt. % of the final mixture).

TABLE I

| Trial | Polymer (.48% by wt. of gel solution) | wt. % Ti | % by wt. of gel solution | | Vortex Closure Time (min) |
|---|---|---|---|---|---|
| | | | Hydroxyacetic Acid | Aetic Acid | |
| 1 | HPG | .012 | 0.0 | 0.14 | .017 |
| 2 | HPG | .012 | 0.017 | 0.14 | 0.1 |
| 3 | HPG | .012 | 0.034 | 0.14 | 1.63 |
| 4 | HPG | .012 | 0.042 | 0.14 | >60[1] |

TABLE I-continued

| Trial | Polymer (.48% by wt. of gel solution) | wt. % Ti | % by wt. of gel solution Hydroxyacetic Acid | Aetic Acid | Vortex Closure Time (min) |
|---|---|---|---|---|---|
| 5  | GUAR   | .006 | 0.0   | 0.07 | .017 |
| 6  | GUAR   | .006 | 0.021 | 0.07 | .52  |
| 7  | GUAR   | .006 | 0.025 | 0.07 | 1.04 |
| 8  | GUAR   | .006 | 0.042 | 0.07 | >30  |
| 9  | CMHPG* | .006 | 0.0   | 0.07 | .017 |
| 10 | CMHPG* | .006 | 0.042 | 0.07 | .08  |
| 11 | CMHPG* | .006 | 0.057 | 0.07 | .12  |
| 12 | CMHPG* | .006 | 0.11  | 0.07 | 3.08 |
| 13 | CMHPG* | .006 | 0.18  | 0.07 | >30  |
| 14 | CMHEC* | .006 | 0.0   | 0.07 | .017 |
| 15 | CMHEC* | .006 | 0.057 | 0.07 | .12  |
| 16 | CMHEC* | .006 | 0.11  | 0.07 | 2.45 |
| 17 | CMHEC* | .006 | 0.18  | 0.07 | 15.5 |

*pH adjusted to 7 prior to use, due to high residual caustic content in manufacture of the polymer.
[1]In Table I and throughout this application, a vortex closure time of greater than a specified value means the vortex had not completely closed at the specified time but there were visual signs of crosslinking.

It will be seen from the results of Table I then, that the delay in crosslinking time in gel solutions of the types prepared in Example 1 can be adjusted by the concentration of hydroxyacetic acid in the gel solution, and hence can simply be controlled by varying the amount of hydroxyacetic acid present in the crosslinker composition prior to addition to the polymer solution. It will also be appreciated, particularly in view of Table I above, that the amount of organic metal complex utilized to produce sufficient crosslinking (that is produce a gel which does not have too low or too high a viscosity) will depend upon the particular organic polymer utilized. Furthermore, as will be observed fom Trials 5-17, even when the titanium concentration from the organo titanium complex is constant, the amount of hydroxyacetic acid required from a given delay in crosslinking will vary depending upon the polymer with which the composition is used.

It has also been discovered that the length of the crosslinking delay resulting from use of a crosslinker compositions of the present invention to prepare the gel solution, is affected by the pH of the gel solution. The results of Example 2 below illustrate the effect of pH.

Example 2

The same procedure was utilized as in trials 1-4 of Table I (HPG polymer), except that prior to addition of the crosslinker composition to the polymer solution, HCl was added to obtain a solution with pH less than 4, while NaOH was added to obtain a solution with a pH greater than 4. The titanium concentraton in the gel solution was 0.0025M (substantially 0.012 wt. % of the composition), while the hydroxyacetic acid concentration in each trial was 0.0044M (substantially 0.034 wt. % of the gel solution). The results are summarized in Table II below.

TABLE II

| pH of Gel Mixture | Vortex Closure Time (min) |
|---|---|
| 3.32 | >20 |
| 4.00 | 3.17 |
| 5.05 | 0.05 |

It will be seen from the results of Table II above then, tht as pH is lowered the crosslinking delay time increases. When the gel solution is to be used in fracturing a typical oil well, generally one would desire a vortex closure time of somewhere between approximately 30 seconds to 25 minutes. It will be seen from Table II above, then, that it would be desirable in many cases to maintain the pH of the gel mixture at less than about 5, and preferably about 3 to about 4, when the gel solution is to be used for such purpose. To illustrate the performance of crosslinker compositions of the present invention, at different temperatures, the trials of Example 3 below were conducted.

Example 3

Three crosslinker compositions were prepared as follows:
(A) Mix 0.62 millimoles (hereinafter often referred to as "mmoles") of triethanolamine titanate, 5.92 mmoles of acetic acid, 1.90 mmoles of hydroxyacetic acid, and 3.96 mmoles of water.
(B) Mix 0.31 m moles of triethanolamine titanate, 2.96 mmoles of acetic acid, 0.95 mmoles of hydroxyacetic acid, 1.98 mmoles of water.
(C) Mix 0.31 mmoles triethanolamine titanate, 2.96 mmoles of acetic acid, 3.80 mmoles of hydroxyacetic acid, and 7.92 mmoles of water.

A gel solution was prepared by using selected polymer solutions and one of the preceding crosslinker compositions using the following procedure:
(1) Add 250 mL of the selected aqueous polymer solution to a 500 mL WARING blender jar.
(2) Adjust the pH to 6-8 if needed with aqueous NaOH or HCl.
(3) Adjust the speed of the blender to produce the maximum vortex size with minimum air entrainment.
(4) Add the crosslinker composition.
(5) Mix for 10 seconds and transfer 50 mL of fluid to a 50C viscometer rotor.
(6) Maintain a constant shear rate of 85 sec $^{-1}$ between shear rate ramps.
(7) Perform shear rate ramps of 85, 170, 255, 340, 425, and 510 sec$^{-1}$ at 75° F. three minutes after the addition of the crosslinker, and then again immediately upon reaching the test temperature (which required approximately a further 20 minutes).

The results of the viscosity measurements at 75° F. (room temperature) and 200° F. are summarized in Table III below.

TABLE III

| Crosslinker Composition | Polymer | wt. % of gel solution Ti | Hydroxyacetic Acid | Acetic Acid | Viscosity (cp) @ 170 sec$^{-1}$ 75° F. | 200° F. |
|---|---|---|---|---|---|---|
| A | .48% HPG   | 0.012 | 0.057 | 0.14 | 69  | 177 |
| B | .48% GUAR  | 0.006 | 0.034 | 0.07 | 76  | 130 |
| C | .48% CMHPG | 0.006 | 0.11  | 0.07 | 135 | 343 |
| C | .48% CMHEC | 0.006 | 0.11  | 0.07 | 192 | 141 |

It will be apparent from the results from Table III, that gels produced using the crosslinker composition of the present invention, exhibit good viscosities even at higher temperatures. It was also noted during this series of experiments that the rate of crosslinking in each case appeared to increase as the temperature increased. With regard to the trial utilizing CMHEC, crosslinking of CMHEC with concentrations of titanium, hydroxyacetic acid, and acetic acid, similar to those in that trial of Example 3, would be rapid, requiring only in the vicinity of less than ten seconds. This is illustrated by the results of Trial 16 in Table I. Thus, since the room temperature viscosity measurements in Table III were taken three minutes after addition of the crosslinker composition, crosslinking in the CMHEC gel solution would have already been completed considerably earlier. Therefore, the lower viscosity of the CMHEC gel at a higher temperature in Table III, likely merely indicates thinning of the gel with increasing temperature, as one would normally expect.

To illustrate the usefulness of other organic metal complexes in the crosslinker compositions of the present invention, crosslinker compositions were prepared utilizing various organic metal complex solutions, acetic acid, and 66 wt. % hydroxyacetic acid solution, in a ratio by volume of 2/2/1. The complexes utilized included alcohol solutions of titanium ammonium lactate sold under the trademark "TYZOR LA," and of titanium acetylacetonate sold under the trademark "TYZOR AA" (all of the foregoing being trademarks of E. I. duPont de Nemours and Company, Inc.). The pH of the foregoing crosslinker compositions, as well as a crosslinker composition utilizing an alochol solution of zirconium triethanclamine in place of the foregoing organo titanium complexes, are listed below in Table IV.

TABLE IV

| Organic Metal Complex Used | % by weight of crosslinker composition | | | |
|---|---|---|---|---|
| | Metal | Hydroxyacetic Acid | Acetic Acid | pH |
| TYZOR LA | 3.4 | 14.6 | 36.0 | 2.79 |
| TYZOR AA | 3.7 | 15.8 | 39.3 | .34 |
| Zirconium triethanolamine | 1.4 | 16 | 40.0 | 2.84 |

Using the method described in connection with Table I, vortex closure times were then measured at room temperature for gel solutions prepared with the above various crosslinker compositions and an aqueous polymer solution of 0.48 wt. % CMHPG. In each case two gallons of the crosslinker composition were mixed with sufficient polymer solution to produce 1,000 gallons of gel mixture. Thus, in each case the resulting hydroxyacetic acid concentration is 0.03 wt. % of the gel solution, and the acetic acid concentration 0.08 wt. % of the gel solution. The metal concentrations resulting in the gel solutions from the crosslinker compositions, as well as the pH of the gel solutions and the vortex closure times utilizing the above 2/2/1 crosslinker compositions, are summarized in Table V below.

TABLE V

| 2/2/1 Crosslinker Composition Containing | Metal Concentration (wt. % of Mixture) | pH of gel Solution | Vortex Closure Times (min:sec) |
|---|---|---|---|
| TYZOR LA | .008 | 3.80 | >25:00 |
| TYZOR AA | .008 | 3.61 | 00:20 |
| Zirconium triethanolamine | .003 | 3.85 | >45:00 |

As illustrated by Table V above, then, it is apparent that other organic metal complexes can be utilized in conjunction with the hydroxyacetic acid, to produce a delayed crosslinker composition. In addition, it is important to note that all of the crosslinker compositions of Table IV, other than that containing TYZOR GBA were observed over a 24-hour period and appeared stable. The crosslinker compositions containing titanium triethanolamine used in all of the Examples above, were also found to be stable for at least one week, (which compositions had a pH of between 3 and 4).

It has also been found that the alph-hydroxycarboxylic acid, hydroxyacetic acid, can prouce delayed crosslinking of a carboxylated polymer such as CMHPG by an inorganic aluminum salt. In a further example, an aqueous $CrCl_3$ solution from Blue Grass Chemical, containing 7.5 wt. % $Cr^{+3}$ and having a pH of 2.4, was used. Various amounts of hydroxyacetic acid were combined with the $CrCl_3$ solution to produce a crosslinker composition, which was used to crosslink CMHPG. The procedure of Example 1 was followed to ascertain vortex closure times (with the exception that the $Cr^{+3}$ concentration was at least 0.012 wt. % of the gel solution, but may have been somewhat higher). The results are below in Table VI.

TABLE VI

| Wt. % of hydroxyacetic acid in gel solution | pH of gel solution | Vortex Closure Time (min:sec) |
|---|---|---|
| 0.0 | 5.0 | 00:01 |
| 0.021 | 3.9 | 3:26 |
| 0.042 | 3.7 | 5:34 |

It will be seen from the above Examples and trials, that useful crosslinker delay compositions of the present invention can be prepared which utilize an organic metal complex crosslinking agent, such as the organic titanium and organic zirconium complexes specifically described, a hydroxycarboxylic acid such as hydroxyacetic acid, and which are stable at a low pH. Further, the pH of the compositions are sufficiently low so that when added to a neutral aqueous polymer solution in sufficient amount to produce sufficient crosslinking of the polymer, the pH of the resulting gel solution will be less than about 5, and preferably between about 3 and 4. It will also be seen from the above that the amount of organic metal complex, and other constituents, present, can be varied. In particular, variations in pH of the crosslinker composition can affect the pH of a typically neutral polymer solution, and thereby in turn affect the delay in the crosslinking of the polymer by the organic metal complex. In addition, changes in temperature will affect the crosslinking delay, and more importantly changes in the concentration of the hydroxyacetic acid present in the crosslinker composition and therefore in the gel solution, will also affect such delay. From Table VI it will be seen that soluble inorganic metal salts can be used in combination with the alpha-hydroxyacid to provide a useful delayed crosslinker composition.

Typically, to use the compositions of the present invention to fracture a subterranean formation penetrated by a well in the manner earlier described, either with or without the use of carbon dioxide, one should bear in mind factors including the depth of the well, downhole temperature, rate of pumping of the gel mixture, and the type of aqueous polymer solution being used, in order to ascertain the concentrations of the desired organic metal crosslinking agent, hydroxyacetic acid, and acetic acid which should be present in the gel mixture, and hence should be present in the crosslinker composition to be used and to ascertain the amount of that crosslinker composition to be added to the polymer solution. Depending upon the particular organic metal complex, and the particular polymer, and bearing in mind that typically a 30 second to 25 minute delay would be desirable in most wells under most circumstances, the following ranges of consituents will generally be present in the gel mixture (all numbers being by weight % of the gel solution):

| Polymer | 0.24–0.96 |
|---|---|
| Titanium | 0.0017–0.023 |
| Acetic Acid | 0–0.4 |
| Hydroxyacetic Acid | 0.008–0.4 |

For most crosslinker compositions, the above ranges will translate into the following concentrations in the crosslinker compositions (all figures being by wt. % of the crosslinker composition):

| Titanium | 1–10 (preferably 1–5) |
|---|---|
| Acetic Acid | 0–64 |
| Hydroxyacetic Acid | 2–37 |
| Water | 0–32 |
| Total Solvent (including above water) | 5–40 |

It may be possible to operate outside of the above ranges in both the gel solutions, and the crosslinker compositions. However, the consequences of operating outside of the above ranges for the gel solutions are generally as follows. First, lower concentrations of polymer do not sufficiently increase the viscosity of the resulting gel mixture upon crosslinking. Higher concentrations of polymer will result in more viscous gels upon crosslinking, which may be difficult to handle in most field equipment. Lower concentrations of triethanolamine titanante on the other hand, reduce gel strength, while higher concentrations may cause syneresis. Lower concentrations of acetic acid will reduce delay times as the pH will increase, whereas higher concentrations may produce unduly long delay times and reduce the stability of the crosslinked gel at elevated temperatures. Higher concentrations of hydroxyacetic acid on the other hand, may produce excessive delay times and reduce the viscosity of the crosslinked gel. As noted above though, the acetic acid concetration can be 0. For example, a 1/6/30 mole ratio of triethanolamine titanate, hydroxyacetic acid and water, respectively, was used as a crosslinker composition which was added to an aqueous HPG solution (0.48% HPG wt. % based on total weight of solution), following the method of the trials of Table I (the titanium concentration from the complex, in resulting gel solution being 0.006 wt. % of that solution). The vortex closure time at room temperature was measured at greater than 20 minutes.

With regard to variations in concentrations of components in the crosslinker compositions, outside the above ranges, such variations are again possible and in many cases if the relative concentrations of components in the composition remain within the ranges suggested above, then the desired concentrations of components from the crosslinker compositions in the gel solution, can be obtained simply by varying the addition rates of the crosslinker compositions to the polymer solution. However, it should be noted that if the concentration of any particular constituent of the crosslinker composition, becomes relatively low, such may have to be compensated for by considerably increasing the volume of crosslinker composition required for a given volume of polymer solution. This may result in rates of addition of crosslinker composition to polymer solution which are too high to be conveniently accommodated by typical equipment. Alternatively, in situations where only relatively small volumes of crosslinker composition are required for a given volume of polymer solution, the crosslinker composition can be conveniently diluted with a suitable solvent such as water or methanol, to facilitate accurate monitoring of the addition rate with conventional equipment.

It may also be possible to use organic metal complexes other than the Zr and Ti complexes used in the above Examples. In such case, the ability of the selected metal complex to crosslink any particular polymer should be considered. Table VI below lists the ability of some metal ions to crosslink with various polymers, at a pH of about 3 to about 4 (such ability may be altered by the pH for example $Zr^{+4}$ will crosslink Guar and HPG at a pH of greater than about 5, and in particular at a pH of greater than 6).

TABLE VII

| Metallic Crosslinker | Polymer | | | | General Comments |
|---|---|---|---|---|---|
| | Guar | HPG | CMHPG | CMHEC | |
| Zirconium (4+) | No Crosslink | No Crosslink | Will Crosslink | Will Crosslink | Crosslinking rate depends on ligand |
| Titanium (4+) | Will Crosslink | Will Crosslink | Will Crosslink | Will Crosslink | Crosslinking rate very rapid |
| Aluminum (3+) | No Crosslink | No Crosslink | Will Crosslink | Will Crosslink | Poor thermal stability |
| Antimony (5+) | Will Crosslink | Will Crosslink | Will Crosslink | — | Poor thermal stability |
| Chromium (3+) | No Crosslin | No Crosslink | Will Crosslink | Will Crosslink | Stability poor above pH 4.0. |

It will be appreciated that other substances may be present in the crosslinker composition or polymer solution, provided such do not interfere with the methods described above. For example, proppants (e.g. sand, bauxite, glass beads, etc.) corrosion inhibitors and viscosity stabilizers (e.g. $(NH_4)_2S_2O_3$ or methanol) can be and typically are added to the polymer solutions. Further, it is possible to use other alpha-hydroycarboxylic acids in place of hydroxyacetic acid. Such other acids include lactic, mandelic, glyceric, malic, tarteric, citric acids, and the like. Various other modifications and alterations to the compositions and methods of the present invention, which are still within the scope of the present invention, will be evident to those skilled in the art. The scope of the present invention therefore, is to be determined from the following claims.

I claim:

1. A crosslinker composition that can produce delayed crosslinking of an aqueous solution of a crosslinkable organic polymer, consisting essentially of about 1% to about 10% by weight of an organic zirconium complex and about 2% to about 37% by weight organic hydroxycarboxylic acid selected from the group consisting of lactic, mandelic and hydroxyacetic acids the pH of the composition being no greater than 4.8.

2. A composition as described in claim 1 wherein the organic zirconium complex is zirconium triethanolamine and wherein the hydroxycarboxylic acid is hydroxyacetic acid.

3. A crosslinker composition as described in claim 1 wherein the pH is no greater than 4.5.

4. A composition as described in claim 3 wherein the composition, when added in sufficient quantity to the aqueous solution of the crosslinkable organic polymer to produce delayed crosslinking of the polymer, produces a resulting solution with a pH less than about 5.

5. A composition as described in claim 1 wherein the composition, when added in sufficient quantity to the aqueous solution of the crosslinkable organic polymer to produce delayed crosslinking of the polymer, produces a resulting solution with a pH less than about 5.

6. A composition as described in claim 5 wherein the hydroxycarboxylic acid is hydroxyacetic acid.

7. A composition as described in claim 6 wherein the composition additionally comprises a solvent in the weight percentage of about 7% to about 54% and additionally comprises acetic acid in the weight percentage of about 2% to about 64%.

8. A method of preparing a gel solution having a pH less than 5 consisting essentially of combining with an aqueous solution of an organic crosslinkable polymer, an effective amount of a crosslinker composition to result in delayed crosslinking of the polymer, the crosslinker composition consisting essentially of about 1% to about 10% by weight organic zirconium complex to crosslink the polymer, and about 2% to about 37% by weight hydroxycarboxylic acid selected from the group consisting of lactic, mandelic and hydroxyacetic acids to delay crosslinking of the polymer by the zirconium complex, and having a pH of no greater than 4.8.

9. A method as described in claim 8 wherein the hydroxycarboxylic acid is hydroxyacetic acid.

10. A method as described in claim 8 wherein the polymer is selected from carboxymethyl hydroxypropyl guar and carboxymethyl hydroxyethyl hydroxyethyl cellulose, and wherein the organic zirconium complex is zirconium triethanolamine.

11. A method as described in claim 10 wherein the polymer is selected from carboxymethyl hydroxypropyl guar and carboxymethyl hydroxyethyl cellulose, and wherein the organic metal complex is zirconium triethanolamine.

12. A method as described in claim 8, wherein the amount of polymer in the polymer solution, and the amounts of organic zirconium complex and hydroxycarboxylic acid in the crosslinker composition are sufficient so that after addition of the crosslinker composition to the polymer solution, the resulting mixture has by weight percent, between 0.24% to 0.96% polymer, 0.0017% to 0.023% zirconium from the organic zirconium complex, and 0.0086 to 0.4% hydroxycarboxylic acid.

13. A method as described in claim 10, wherein the amount of polymer in the polymer solution, and the amounts of organic zirconium complex and hydroxycarboxylic acid in the crosslinker composition are sufficient so that after addition of the corsslinker composition to the polymer solution, the resulting mixture has by weight percent, between 0.24% to 0.96% polymer, 0.0017% to 0.023% zirconium from the organic zirconium complex, and 0.0086% to 0.4% hydroxycarboxylic acid.

* * * * *